United States Patent [19]
Toughlian et al.

[11] Patent Number: 5,220,163
[45] Date of Patent: Jun. 15, 1993

[54] MICROWAVE ADAPTIVE TRANSVERSAL FILTER EMPLOYING VARIABLE PHOTONIC DELAY LINES

[75] Inventors: Edward N. Toughlian, Rome, N.Y.; Henry Zmuda, Carteret, N.J.

[73] Assignee: The United States of America as represented by the Secretary of the Air Force, Washington, D.C.

[21] Appl. No.: 862,097

[22] Filed: Apr. 2, 1992

[51] Int. Cl.⁵ .............................................. G02F 1/11
[52] U.S. Cl. ................................ 250/201.9; 359/287; 359/314; 342/375
[58] Field of Search ............... 250/201.9, 227.12, 550; 359/314, 305, 308, 312, 285, 287, 331, 306; 385/27; 372/700; 333/144, 147, 193, 195; 356/121, 349; 342/25, 375

[56] References Cited
U.S. PATENT DOCUMENTS

| | | | |
|---|---|---|---|
| 3,544,806 | 3/1968 | DeMaria et al. | 359/331 |
| 4,390,247 | 6/1983 | Freyre | 359/314 |
| 4,565,983 | 1/1986 | Gratze | 359/285 |
| 4,696,061 | 9/1987 | Labrum | 359/285 |
| 4,976,518 | 12/1990 | Burns | 385/27 |
| 5,117,239 | 5/1992 | Riza | 342/375 |

OTHER PUBLICATIONS
Toughlian, Edward N. et al, "A Photonic Variable RF Delay Line for Phased Array Antennas", Journal of Lightwave Technology, vol. 8, No. 12, Dec. 1990, pp. 1824–1828.

Primary Examiner—David C. Nelms
Assistant Examiner—John R. Lee
Attorney, Agent, or Firm—Robert L. Nathans; Donald J. Singer

[57] ABSTRACT

By applying a spatial frequency dependent phase compensation in an optical heterodyning system, a variable rf delay line can be synthesized. The system is able to generate continuously variable phased microwave signals over a prescribed frequency band. A primary application of these variable delay lines is in the area of phased array antenna systems. Because the phototonic delay line synthesizes true time delay, it can be used as part of wide bandwidth system to achieve 100% fractional bandwidth without beam squint. The system lends itself to an optically integrated implementation using a 2-D deformable mirror device to achieve very high packing density which is very useful for an adaptive transversal filter.

20 Claims, 6 Drawing Sheets

MICROWAVE ADAPTIVE TRANSVERSAL FILTER EMPLOYING VARIABLE PHOTONIC DELAY LINES

STATEMENT OF GOVERNMENT INTEREST

The invention described herein may be manufactured and used by or for the Government for governmental purposes without the payment of any royalty thereon.

BACKGROUND OF THE INVENTION

Previously, the only means of obtaining a continuously variable RF time delay was by mechanical methods such as line stretchers. Those methods to steer phased array antennas used electronic phase shifters. They provide RF phase shifts which are independent of the RF frequency. This unwanted behavior results in a beampointing error known as squint, where the different frequency components of a modulated RF carrier will point in different directions. Elimination of this error requires true time delay, where the RF phase shift is linearly proportional to RF frequency. Discrete delay using optical switching circuits has been thoroughly investigated by many researchers but the result has always been the problem of how to deal with the robust power requirements and significant loss of the many optical switches which are required for high resolution delay capability. By using the spatial signal processing technique of the design presented here, continuously variable RF delay is now possible for the first time in an efficient optical architecture.

The phased array application discussed here is a specific example of the general concept of transversal filtering. Thus the integrated transversal filter architecture presented enjoys a wealth of other applications in the field of microwave signal processing.

Conventional electronic methods for generating the necessary phase information for dynamically steered antennas tend to be lossy and inefficient. Also the group delay is not adjustable utilizing these electronic phase shifters. Other optical methods for realizing variable group delay include switched fiber schemes. This technique requires many optical switches to achieve high resolution RF radiation patterns. These optical switches also require enormous power, and tend to be very lossy, hence the lack of a practical implementation to date.

Currently, microwave transversal filtering is achieved using tapped transmission line architectures. These suffer from the same deficiencies as with the phased array applications. Also, the delays are fixed, not variable. The variable delay line presented here now allows for an efficient and reconfigurable microwave adaptive filter.

BRIEF SUMMARY OF THE INVENTION

An object of this invention is to deliver a continuously variable RF group delay over a prescribed frequency band, thereby synthesizing a continuously variable RF delay line. Two areas of extensive application for this invention are beamforming for phased array antennas and reconfigurable transversal filtering. By parallel implementation of the described delay line, a steerable arbitrary antenna radiation pattern of the true time delay type can be achieved. Similarly, the transversal filtering application uses a parallel implementation of variable delay lines to generate arbitrary reconfigurable frequency filtering functions.

BRIEF DESCRIPTION OF THE DRAWINGS

Other objects, features and advantages of the invention will become apparent upon study of the following description, taken in conjunction with the drawings in which.

DETAILED DESCRIPTION OF THE INVENTION

Two major principles are involved in the theory and operation of the delay line; optical heterodyning and spatial dispersion followed by manipulation of the RF frequency components. Optical heterodyning consists of the mixing of two light sources of slightly different frequencies; $A_1 \cos[(\omega_O + \omega_M) t + \phi]$ and $A_2 \cos(\omega_O t)$ (where $\omega_O$ represents the optical (radian) frequency, $\omega_M$ is the microwave frequency by which the optical frequency is shifted, and $\phi$ is the desired optical phase shift); in a photodetector. Since such a detector responds only to the time averaged intensity, the resulting detected electrical signal i(t) will contain terms of the form.

$$i(t) = \frac{A_1^2 + A_2^2}{2} + A_1 A_2 \cos(\omega_M t + \phi) \quad (1)$$

Thus the output of the photodiode contains an RF frequency component equal to the optical beat frequency $\omega_M$ and an RF phase shift equal in angle to the optical phase shift $\phi$. The mixing of two light sources in this way provides a means of obtaining substantial variable RF phase shift, achievable with optical components using phase shifts arising from optical path differences on the order of optical wavelengths.

Figure 1:
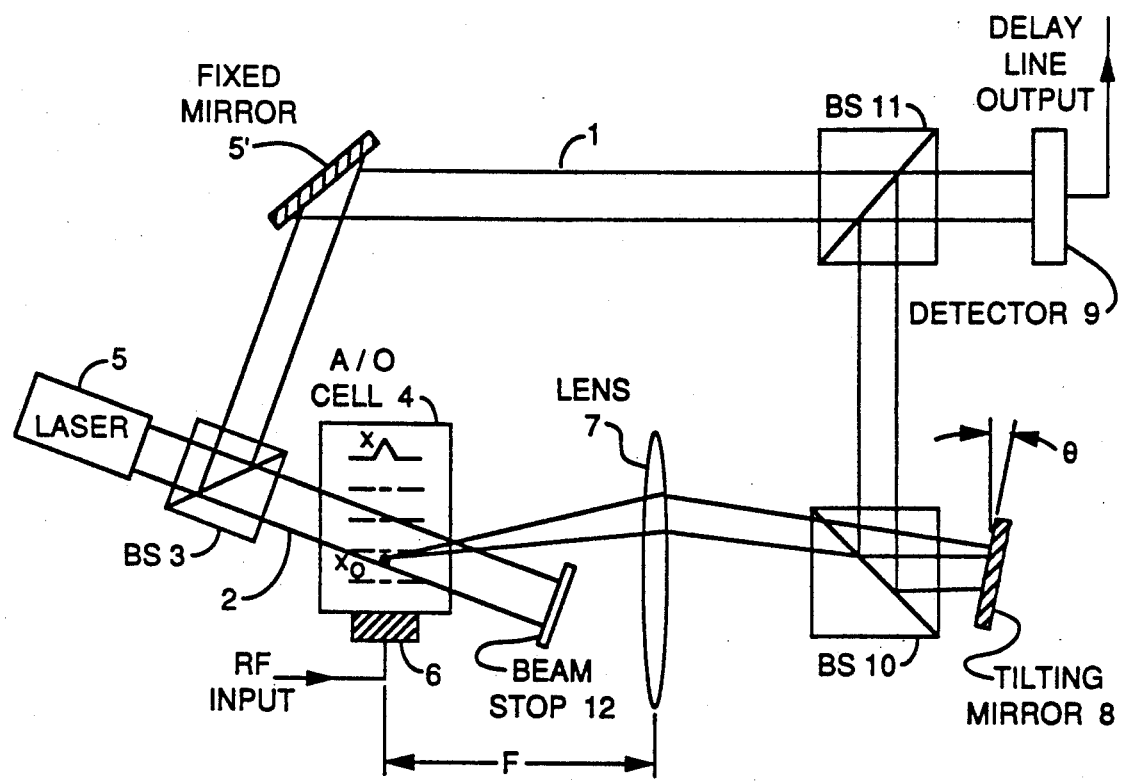
FIG. 1 illustrates the delay line theory of the invention.

By utilizing an acousto-optic cell as the frequency shifter in a heterodyne configuration, a continuously variable time delay can be achieved. Referring to FIG. 1, its seen that the output of the laser 5 is split by beamsplitter 3 into a plane wave local oscillator beam 1 (upper path including mirror 5') which simply acts as a phase reference, and a signal beam 2 which is sent to an acousto-optic (A/O) cell frequency shifter means 4. Acousto-optical cell 4 operates by applying the RF signal input to a piezoelectric transducer 6 mounted on a substrate which efficiently propagates an acoustic wave in the x direction as shown. The physical length of the cell times the velocity of the acoustic wave $y_s$ provides a significant time delay t across the length of the cell, or $t = x(t)/v_s$. Using lens 7 shown in the figure, each point along the path of the x axis in the A/O cell generates a plane wave which is incident on a tiltable mirror 8. The angle of this plane wave uniquely corresponds to a spatial coordinate x(t) along the axis of propagation of sound in the cell. FIG. 1 shows a single plane wave for a fixed value of time T.

Two plane waves, one frequency shifted relative to the other, can interfere only when they are of the same angle (spatial frequency). For optical frequency $f_o$, the plane wave which represents the signal beam can be expressed $$a_s(t) = A_s e^{j[2\pi f_s t + 2\pi \alpha x + \phi_o]} \cdot e^{j2\pi f_o t} \quad (2)$$

where $\alpha$ represents the spatial frequency or tilt of the wave measured with respect to the plane wave reference beam $$a_{LO}(t) = A_{LO} e^{j2\pi f_o t} \quad (3)$$

Note that the reference phase of the local oscillator beam is arbitrarily taken to be zero. The photodetector 9 integrates the intensity over all space of the summed signal and reference plane waves producing in the electrical signal i(t) proportional to the time-averaged intensity.

$$i(t) = \frac{1}{2} \int_{-\infty}^{\infty} |A_{LO} + A_s e^{j[2\pi f_s t + 2\pi \alpha x + \phi_o]}|^2 dx \quad (4)$$

Using an identity from Fourier analysis, the impulse or delta function $\delta(\cdot)$ be expressed as $$\delta(\alpha) = \int_{-\infty}^{\infty} e^{j2\pi \alpha x} dx \quad (5)$$

The integral of Equation 4 is readily evaluated. Neglecting the d.c. terms we find that:

$$i(t) = A_{LO} A_s \cos[2\pi f_s t + \phi_o] \cdot \delta(\alpha) \quad (6)$$

The tilt of the mirror 8 (i.e. choosing $\alpha$), selects which plane wave will beat with the local oscillator in the detector. Of course in a non-ideal system plane waves are not realizable, and therefore diffraction limiting effects give the system finite resolution. Beamsplitters 10 and 11 recombine the signal and reference beams as shown.

For the simplified system of FIG. 1, a straightforward geometrical (ray) optical analysis shows that the time delay realized as a function of the lens focal length F, mirror tilt angle $\theta$ and acoustic velocity $v_2$ is $T = \tan(2\theta)F/V_s$. In the fully engineered system, the simplified optical system typically becomes more sophisticated due to design requirements. The purpose of beamstop 12 is to prevent the unmodulated light from entering the lens.

Figure 2:
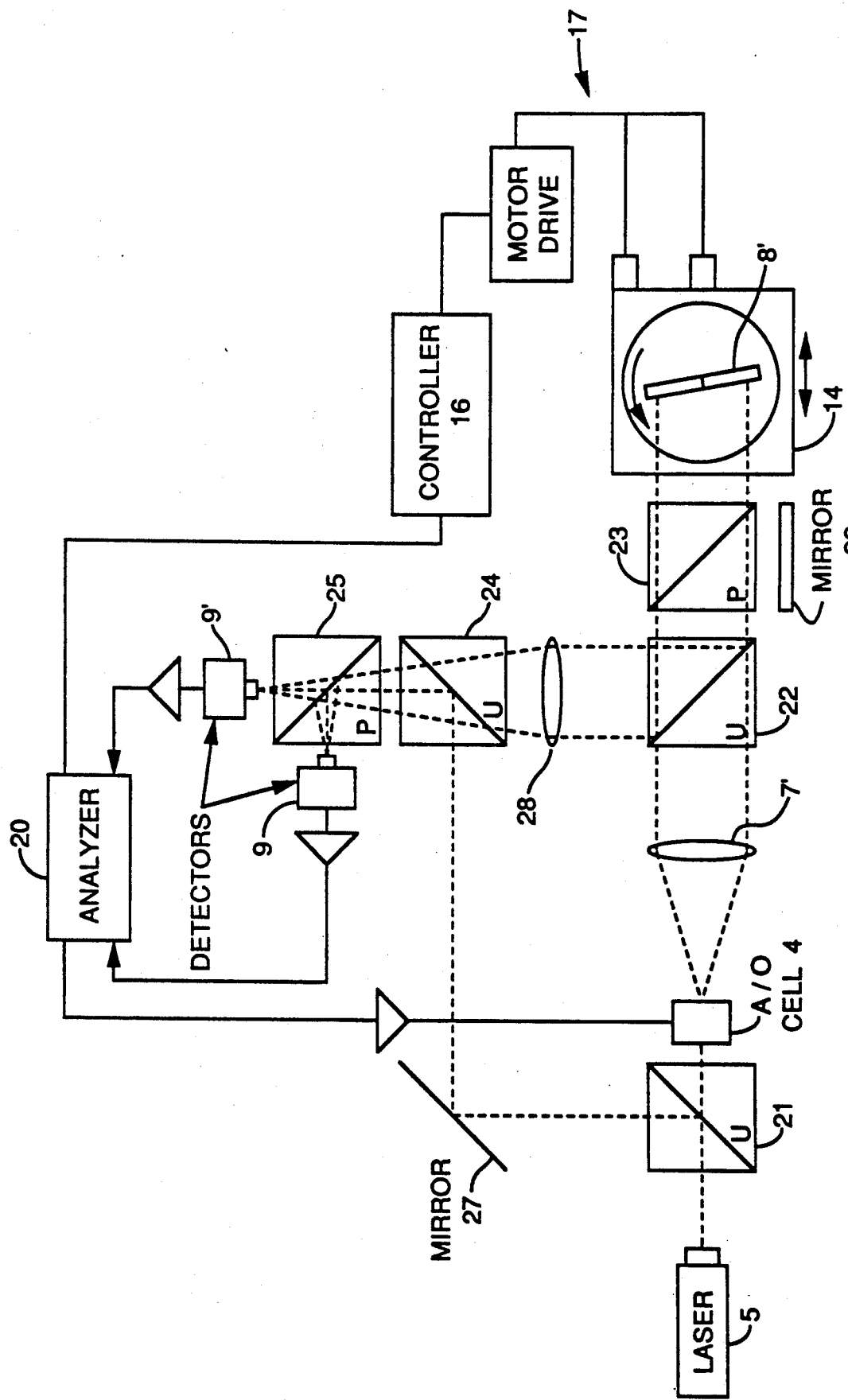
FIG. 2 illustrates an experimental setup useful in understanding the invention.

The experimental setup used to demonstrate the delay line performance is shown in FIG. 2. The modulation is accomplished by writing the RF signals to acousto-optic cell 4. The frequency range was 55 MHz to 85 MHz; the area of flat gain for the acousto-optic cell A cylindrical lens 7' is used to stop the spread and image the A/O cell on mirror 8' capable of tilt. This mirror was mounted on a motorized stage 14 capable of precise translation to within 25 nanometers and rotation with 175 microradian resolution. Computer controller 16 and drive means 17 were used for this purpose. The AO cell 4 produced a 6.5 milliradian angular spread between between the high and low frequency limits. A 150 millimeter lens 7' was used to image this on the mirror resulting in a spread of 0.1 millimeters. The problem of drift due to temperature fluctuations and air currents was essentially eliminated by using one polarization of the laser as a (zero phase) reference for the network analyzer 20 and only allowing the other polarization to see the phase compensating mirror 8'. Beamsplitter cubes 21-25 and mirrors 26 and 27 were used for this purpose. "P" denotes polarization cubes 23 and 25. Photodetectors 9 and 9' output the aforesaid signals in the electrical domain. Lens 28 focuses the beams upon the photodetectors.

Figure 3A:
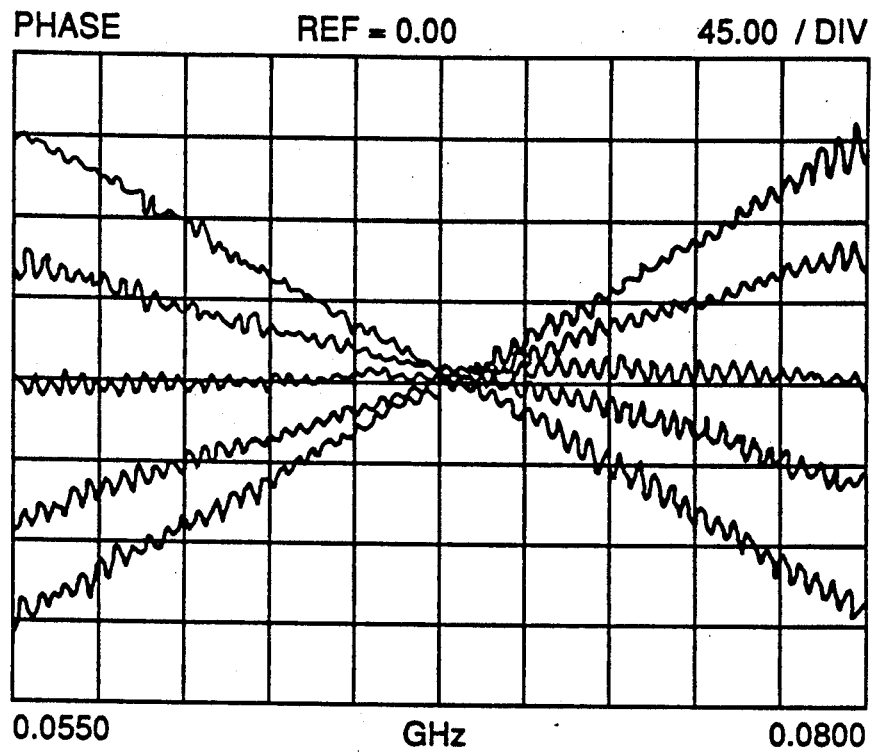
FIGS. 3a and 3b illustrate measured data of phase vs. frequency.
Figure 3B:
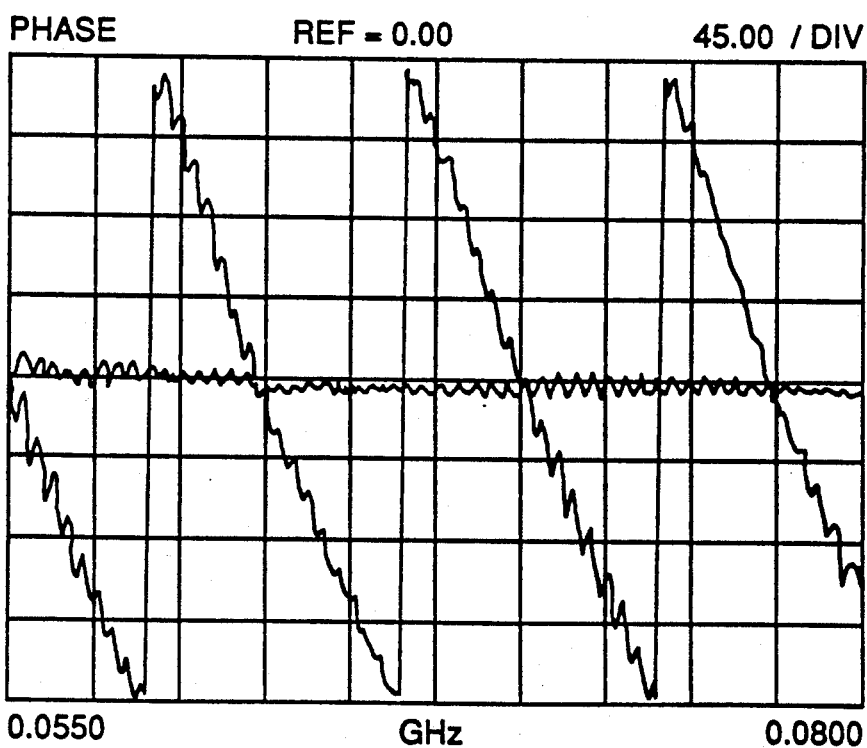
Figure 4:
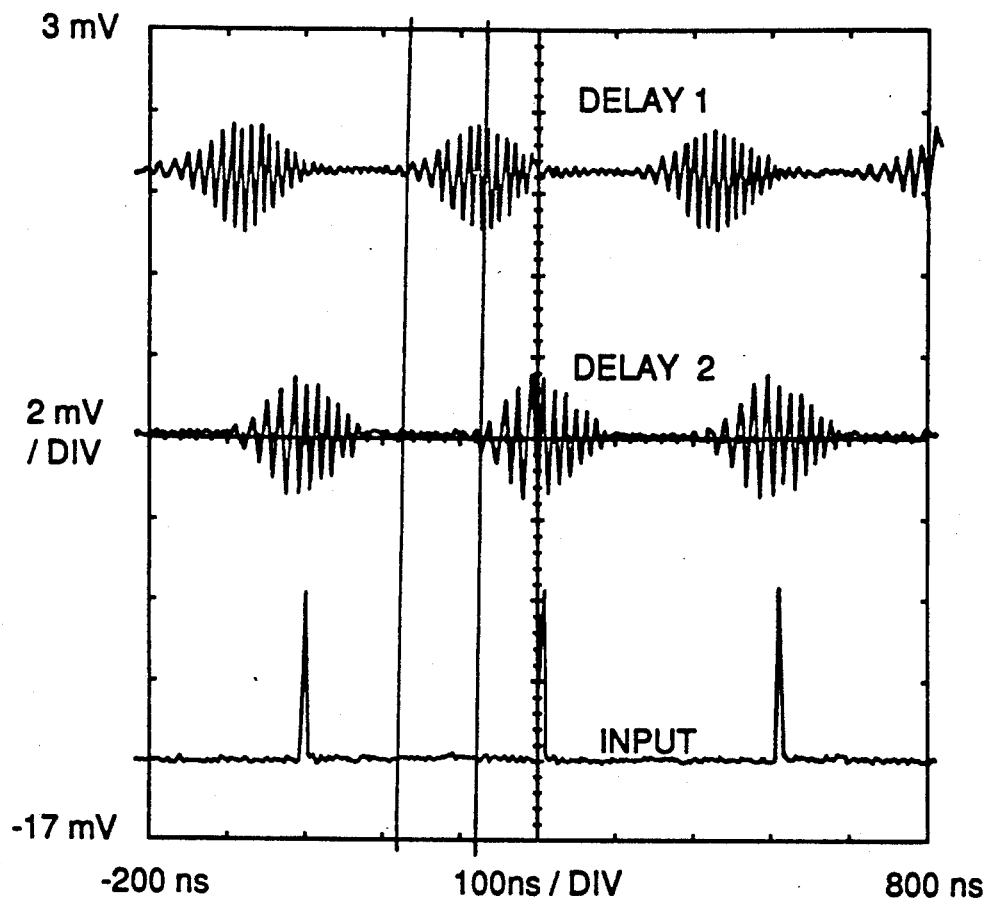
FIG. 4 illustrates impulse response of measured data.

FIGS. 3a and 3b illustrate the electrical phase ($\phi$) response of the optical bench system of FIG. 2 as a function of RF frequency f measured with microwave network analyzer 20. Specifically, FIG. 3a shows five curves, each of which represents a different tilt of the mirror 8', i.e., a different electrical delay; note that the slope of the phase vs. frequency $\Delta\phi/\Delta(2\pi f)$ gives the time delay in seconds. FIG. 3b goes on to show that further tilting of the mirror can result in substantial (greater than 100 nanoseconds) delay. It is also instructive to consider time domain (impulse response) data as shown in FIG. 4. The bottom trace in the figure shows the input pulses spaced 300 nanoseconds apart. After some residual system delay of about 120 nanoseconds, the output pulse corresponding to the first input pulse appears at the first vertical cursor. As demonstrated by the middle trace at the second vertical tracer, the location of the output pulse can be continuously varied in time. It is seen that a delay of 100 nanoseconds is readily achieved by providing the appropriate mirror tilt.

Figure 5:
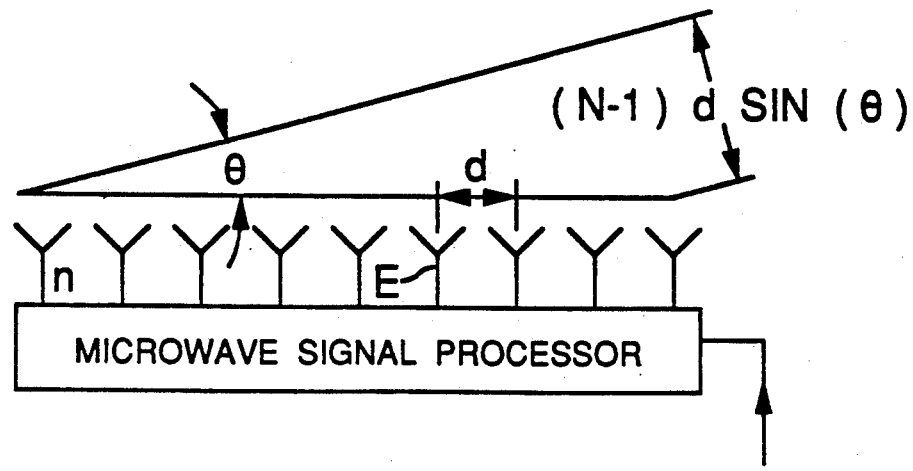
FIG. 5 schematically illustrates a steered phase array antenna.

The basic concepts relevant to steering an antenna aperture of length D can be understood by referring to FIG. 5. For the present discussion of the simple case of a linear, equally spaced, one dimensional array of isotropic radiating elements E is considered. The concepts discussed can be extended to more general arrays. From FIG. 5 it is seen that to steer an electromagnetic (far field) plane wave an angle $\theta$ requires delaying the signal to the $n^{th}$ antenna element by an amount $T_\eta(\theta) = nd \sin(\theta)/c$ where c is the speed of light, n is the element number and d is the element spacing.

Figure 6:
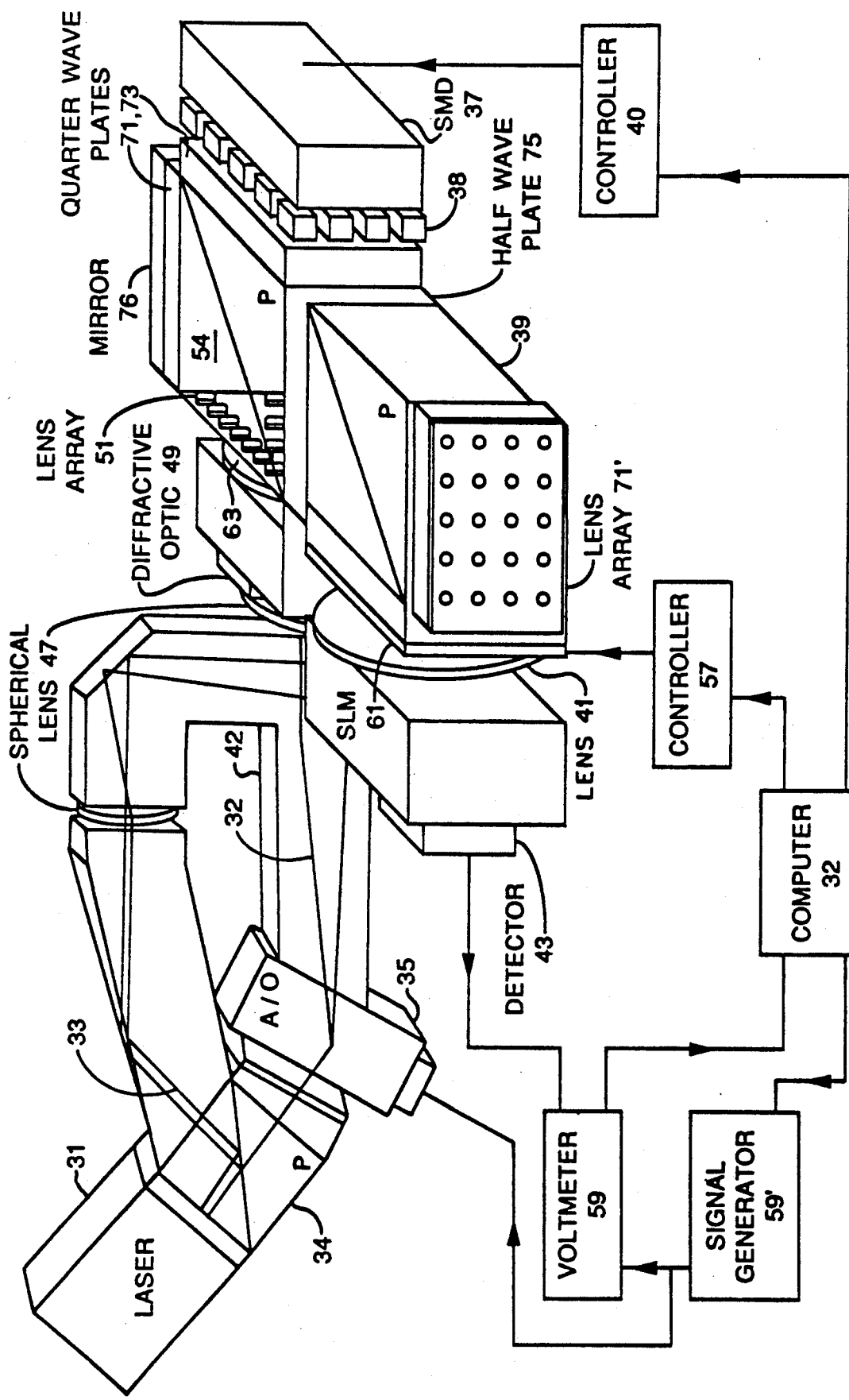
FIG. 6 illustrates a preferred embodiment of the invention.

A set of twenty independently variable delay lines in a spatially integrated configuration is shown in FIG. 6. This system provides the appropriate delays to drive a twenty element broadband phased array antenna. The output of laser 31 is split into two orthogonally polarized beams, by polarizing cube 34, that is a local oscillator beam 33 (upper path) and a signal beam 32 which is frequency shifted by the A/O cell 35 as previously described. The two beams are efficiently combined by a polarizing cube 42 and sent to a diffractive optic device 49, by which the phase reference beam and all the delay information contained in the A/O cell 35 is replicated twenty times. Hence element 49 serves as a replication means. These twenty beams are sent to a polarizing cube 54 via lens array 51, in order to separate the local oscillator beams from the frequency shifted beams. The lensing system for the upper path is designed such that the local oscillator phase reference beam 33 is expanded enough to provide interference (heterodyne) with all frequency components in the signal beam. The upper path lensing system comprises spherical lenses 47, 63, 65 and lens array 51. The lensing system for the lower path images a point (corresponding to a single time delay) in the A/O cell to a plane wave onto a twenty element array of tiltable mirrors 38, shown as a segmented mirror device (SMD) 37. The additional optical arrangement shown comprising polarization cubes 54 and 39, quarter wave plates 71, 73, half wave plate 75, and mirror 76, is then used to appropriately steer the light and ensure that the proper polarization relation between the signal and local oscillator beams is achieved at the two outputs. More particularly, quarter-wave plates 71,73 are placed between the fixed mirror 76 and the beamsplitter cube 54 and between SMD 37 and beamsplitter cube 54 respectively. These rotate the polarizations of both the signal beams and local oscillator beams by ninety degrees in order to direct their energy out of the cube instead of back into the system. The half-wave plate 75 then rotates both the local oscillator beams and orthogonal signal beams by 45 degrees. This allows the following cube 39 to split the light while insuring identical polarization at each output face of the cube. The output at the grin lens array 71 is detected by twenty detectors and contains the properly delayed RF signals used to drive the individual antenna array elements. The twenty beams at the other output are summed by a lens 41 which focus the beams onto a single detector 43 to be used for one of two applications. Using a twenty element light transmissive spatial light modulator (SLM) 61 prior to the summing lens 41, each delay may be individually monitored to provide closed loop delay control. The SLM could be a liquid crystal device. As is apparent to the worker in the art, the SLM crosspoints may be sequentially enabled, one after the other, so that the SLM acts as a shutter device, to render each pixel area transparent to the impinging light on a one pixel at a time basis. This permits phase measuring vector voltmeter 59 to sequentially detect the phase of each output pulse and forwards this phase data to computer 32 which in turn detects erroneous phase shifts and signals SMD controller 40 which adjusts the tilt of the appropriate mirror to eliminate the phase error, in the manner of a closed loop error correction system. Yet only one photodetector 43 is needed for all twenty mirror segments. Alternatively, SLM 61 may be rendered light transmissive across its entire surface, all at one time, to produce a summed output which may be used to obtain an adaptive, reconfigurable, transversal filter.

Figure 8:
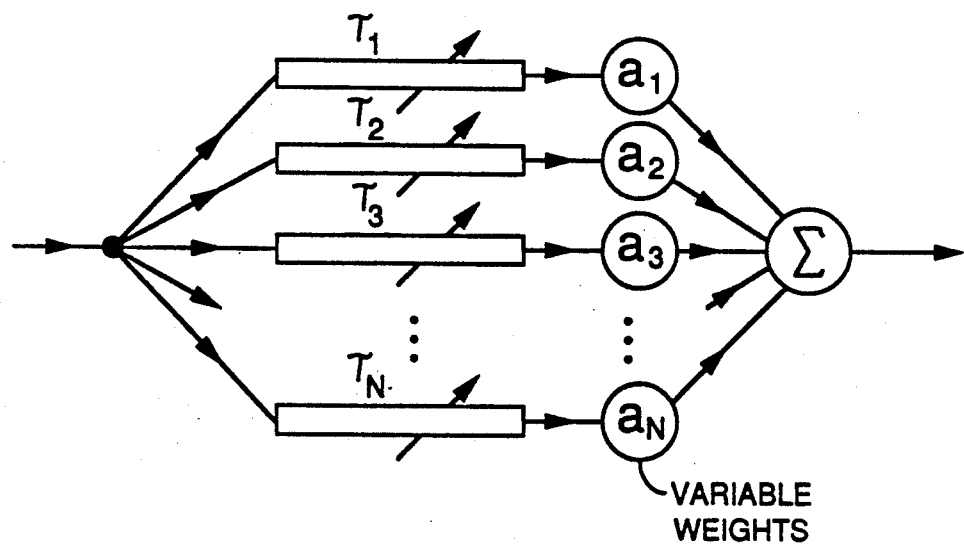
FIG. 8 illustrates a prior art adaptive transversal filter.

In its most general form, as is well known in the art, the output of a transversal filter consists of a sum of weighted and delayed signals of a given electrical input. Using SMD devices 38 to achieve many delay lines in parallel and with a single detector to sum them, a transversal filter is obtained, as schematically illustrated in FIG. 8. It is seen from the figure that the filter is simply the the amplitude weighted sum of delayed versions of the input signal. In order to implement the most general transversal filter, we must be able to realize a transfer function of the form $$H(\omega) = \sum_{i=1}^{N} a_i e^{j\omega T_i + j\phi_i} \quad (7)$$

where the $a_i$ terms are complex constants. Note that the delay parameters T can be continuously varied and are not restricted to be an integral multiple of some unit delay. The term $\phi_i$ is a phase offset term which arises from translation of the SMD elements and will be dealt with momentarily.

It is seen that the values of the time delay $T_i$ for each delay line element is readily obtained by tilting of the SMD elements as before, whereas the amplitude weights $a_i$ can be obtained in a manner shown.

The impulse response $h_i(t)$ of an ideal linear phase bandpass system centered at a frequency $\omega_c$ can be found from its transfer function $H_i(\omega)$ $$H_i(\omega) = H_l(\omega - \omega_c) + H_l(\omega + \omega_c) \quad (8)$$

as $$h_i(t) = \mathcal{F}^{-1}[H_i(\omega)] = h_l e^{j(\omega_c t - \phi_i + \theta_i)} + h_l e^{-j(\omega_c t - \phi_i + \theta_i)} = \quad (9)$$

$$2h_l\cos(\omega_c t - \phi_i + \theta_i)$$

where $h_l(t) = \mathcal{F}^{-1}\{H_l(\omega)\}$ is the low frequency prototype impulse response for delay line and $\theta_i$ is an arbitrary phase shift which can be included for generality. The phase of the cosine term $(-\phi_i + \theta_i)$ is achieved by translation of the $i^{th}$ SMD element. Now consider another such delay line with equal delay ($T_i = T_j$) but a conjugate phase offset ($\phi_i = -\phi_j$), or $$h_j(t) = 2h_l(t)\cos(\omega_c t + \phi_i + \theta_i) \quad (10)$$

When Equations (9) and (10) summed at the output of the transversal filter we obtain $$h_i(t) + h_j(t) = 4h_l(t)\cos(\phi_i)\cos(\omega_c t + \theta_i) \quad (11)$$

Thus by making use of two delay lines in this way and adjusting the phase offset $\phi_i$ by translation of the SMD elements yields the amplitude weighting coefficient $a_i$ as $$a_i = 2\cos(\phi_i) \quad (12)$$

Figure 7A:
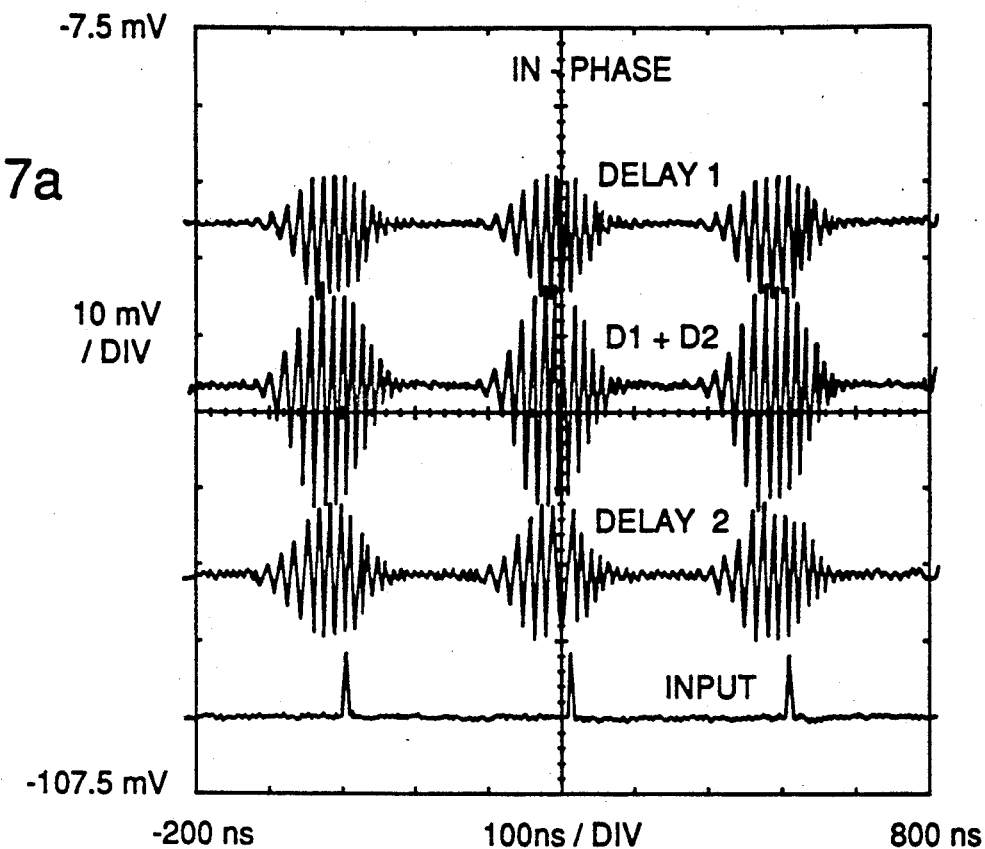
FIGS. 7a and 7b illustrate amplitude weighing of measured data.
Figure 7B:
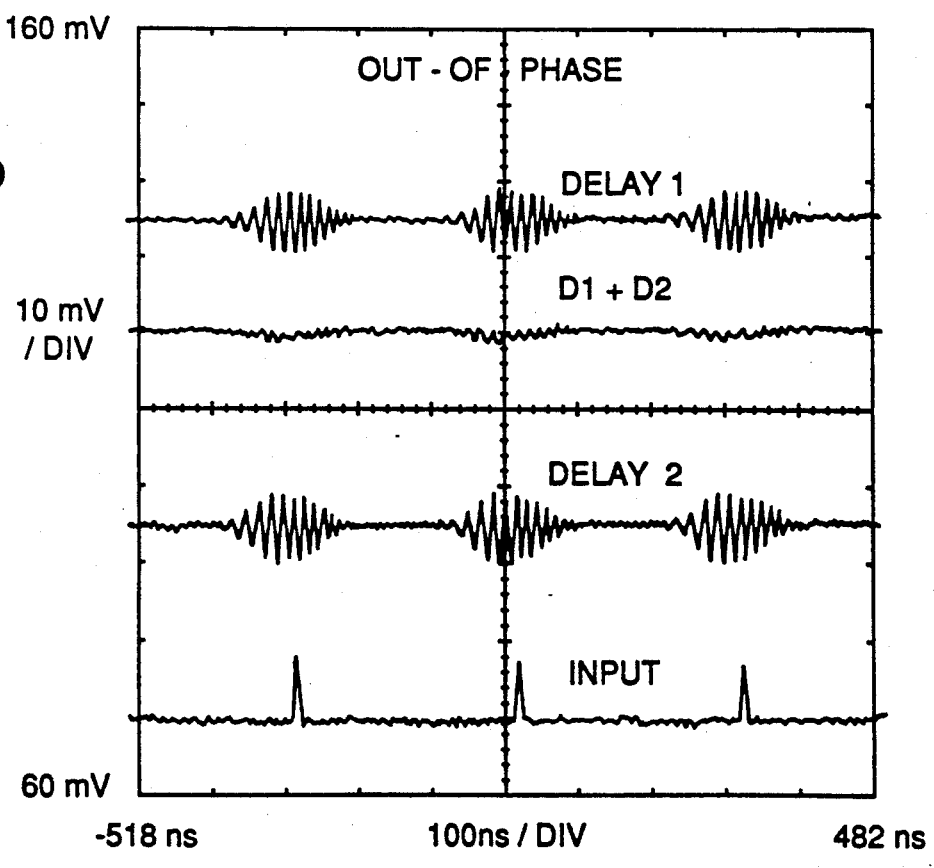

The ideas presented above are best understood by considering the data shown in FIG. 7, obtained by driving the A/O Bragg cell device 35 with a rectangular pulse. The fixed mirror seen in FIG. 2 was mounted on another stage capable of rotation and translation so that a second SMD element or equivalently a second independent delay line was obtained. It was then possible to demonstrate amplitude weighting as discussed previously. The results of the amplitude weighting are shown in FIGS. 7a and 7b. By simply translating either mirror half an optical wavelength, as discussed, the sum given by Equation 11 can be made constructive (FIG. 7a) or destructive (FIG. 7b) or any value between. For the experimental results shown, the two delay line signals were summed in the electrical regime. This summing is easily performed optically as shown in the integrated system of FIG. 6, thereby eliminating the need for a detector for each element. For the integrated system, the mirror elements can be arbitrarily paired off, and tilted for equal RF delay and translated for conjugate optical phase. For example, all of the twenty mirror segments of FIG. 6 can have the same selected tilt for a selected predetermined time delay whereas ten of the mirror segments can be translated relative to the other ten by an appropriate amount to produce any given amplitude weighing. Alternatively, the light transmissive gray scale SLM 61 could provide the amplitude weighting.

With current SMD technology capable of providing in excess of $10^6$ independently controllable elements, using half of these elements for amplitude weighting will not degrade the resolution for most filtering applications.

Using CMOS integrated circuit technology, state-of-the-art SMD's can have in excess of $10^6$ independently controllable mirror elements in a one square centimeter area with greater than a 70% active mirror area. Alternatively, other general classes of electro-optic spatial light modulators exist which emulate in various ways a tiltable mirror. For example, beamsteering or wavefront tilting can be accomplished without physical tilting of the mirror segments by producing a linear (spatial) refractive index change by generating a linear dc voltage gradient across an optical crystal, parallel to the major faces of an SLM having a mirrored backing. The optical processing procedures presented here are thus capable of addressing the needs of ultra-high resolution reconfigurable frequency filtering as well as space-based or any large phased array antenna beamforming application.

The system described herein operates in the transmit mode as a true time delay beamforming network, thus providing a capability unavailable in any other practical form. In the receive mode of operation, the performance of the system as discussed is that of a phase steered system. This is due to the non-reciprocal nature of the acousto-optic cell.

A comment on carrier frequency and system bandwidth is appropriate. The single laser approach presented here limits the system bandwidth including the carrier to a few gigahertz. Carrier frequencies into the millimeter wave frequency range and beyond can be obtained utilizing a variety of approaches to phase lock two lasers operating at slightly different colors (wavelengths). The A/O cell is placed in the path of one of these laser beams to provide RF modulation.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. A transversal filter utilizing an array of independently and continuously variable photonic delay line elements comprising:
    (a) light beam generation means for producing a coherent light beam;
    (b) beamsplitter means for separating said coherent light beam into a reference beam and a signal beam;
    (c) frequency shifting means for frequency shifting the frequency of said signal beam with respect to the frequency of said reference beam to produce a frequency shifted signal;
    (d) combining means for combining the frequency shifted signal with the reference signal to produce an output signal;
    (e) replication means for producing a replicated output signal of the output signal produced by the combining means;
    (f) a first mirror means comprising a segmented mirror device having an array of individually controllable segmented mirror elements, each mirror element defining a terminal portion of an integrated optical delay line element;
    (g) means for directing replicated output signals of the replication means upon associated segmented mirror elements of the segmented mirror device;
    (h) summing means for summing the reflected signals from the segmented mirror elements with the replicated output signals of the replication means; and
    (i) mirror element control means for selectively varying the wavefront tilt of beamlets reflected by the individual segmented mirror elements, thereby to enable the transversal filter to be reconfigured as rapidly as the wavefront tilts can be varied.

2. The transversal filter of claim 1 further including mirror element translation control means for translating selected mirror elements of the first mirror means for producing amplitude weighing of output pulses from said summing means.

3. The transversal filter of claim 1 wherein said replication means comprises a diffractive binary-optic element for producing a needed high packing density of replicated output signals.

4. The method of claim 1 wherein said frequency shifting means comprises an acousto-optical cell.

5. The transversal filter of claim 1 including second beamsplitter means for additionally directing the replicated output signals of the replication means to a drift compensation mirror means and for recombining the beams reflected off of the segmented mirror elements of the first mirror means and the drift compensating mirror means.

6. The transversal filter of claim 5 wherein said replication means comprises a diffractive binary-optic element for producing a needed high packing density of replicated output signals.

7. The transversal filter of claim 5 including a third beamsplitter means for directing the combined output beam of the second beamsplitter means to the summing means and additionally to an array of output signal conduits, each optically coacting with a corresponding segmented mirror element, thereby enabling the output signals emerging from the output signal conduits to be used to drive a phased array radar transmitter or the like.

8. The transversal filter of claim 7 further including a light transmissive spatial light modulator positioned between the third beamsplitter and said summing means and a spatial light modulator controller for either rendering all pixels of the spatial light modulator light transmissive to produce a summed output appropriate for operation in a transversal filter mode or alternatively rendering the pixels light transmissive one at a time for measuring phase errors of output signals from the output signal conduits.

9. The transversal filter of claim 8 wherein said replication means comprises a diffractive binary-optic element for producing a needed high packing density of replicated output signals.

10. The transversal filter of claim 1 wherein said summing means comprises a unitary optical-to-electrical transducer and optical means for simultaneously directing all reflected light signals from the segmented mirror elements upon the unitary optical-to-electrical transducer, thereby to eliminate the need for numerous optical-to-electrical detector elements for each segmented mirror element which would otherwise be required.

11. The transversal filter of claim 10 further including mirror element translation control means for translating selected mirror elements of the first mirror means for producing amplitude weighing of output pulses from said summing means.

12. The transversal filter of claim 10 wherein said replication means comprises a diffractive binary-optic element for producing a needed high packing density of replicated output signals.

13. The method of claim 10 wherein said frequency shifting means comprises an acousto-optical cell.

14. The transversal filter of claim 10 including second beamsplitter means for additionally directing the replicated output signals of the replication means to a drift compensation mirror means and for recombining the beams reflected off of the segmented mirror elements of the first mirror means and the drift compensating mirror means.

15. The transversal filter of claim 14 wherein said replication means comprises a diffractive binary-optic element for producing a needed high packing density of replicated output signals.

16. The transversal filter of claim 14 including a third beamsplitter means for directing the combined output beam of the second beamsplitter means to the summing means and additionally to an array of output signals conduits, each optically coacting with a corresponding segmented mirror element, thereby enabling the output signals emerging from the output signal conduits to be used to drive a phased array radar transmitter or the like.

17. The transversal filter of claim 16 further including a light transmissive spatial light modulator positioned between the third beamsplitter and said summing means and a spatial light modulator controller for either rendering all pixels of the spatial light modulator light transmissive to produce a summed output appropriate for operation in a transversal filter mode or alternatively rendering the pixels light transmissive one at a time for measuring phase errors of output signals from the output signal conduits.

18. The method of claim 16 wherein said frequency shifting means comprises an acoustic-optical cell.

19. The transversal filter of claim 16 wherein said replication means comprises a diffractive binary-optic element for producing a needed high packing density of replicated output signals.

20. The method of claim 19 wherein said frequency shifting means comprises an acousto-optical cell.

* * * * *